Sept. 13, 1932.   H. W. LORMOR   1,876,988
SHUT-OFF VALVE FOR FILLING NOZZLES
Filed Sept. 10, 1927
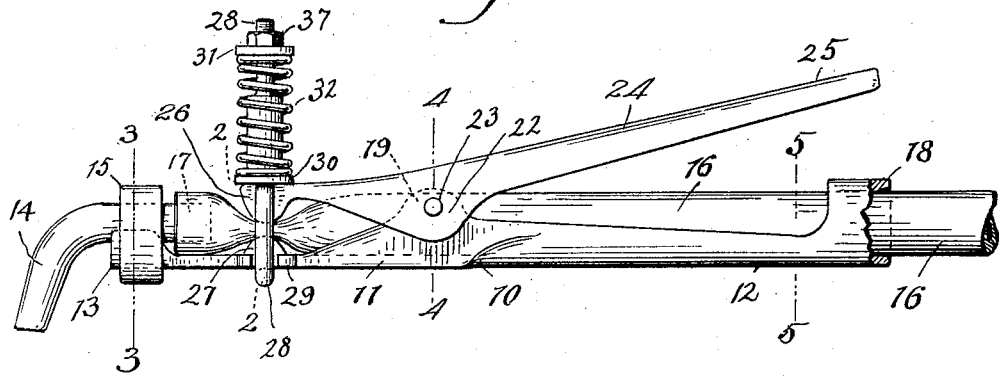
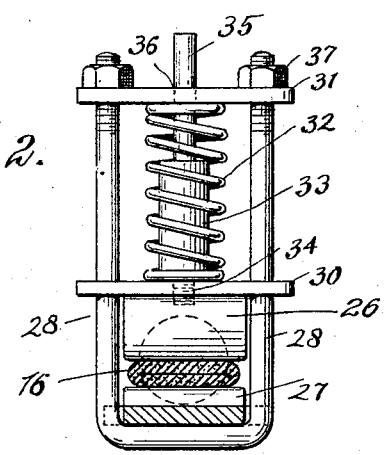
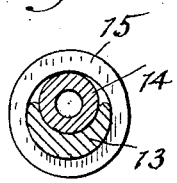
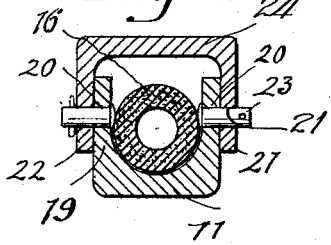
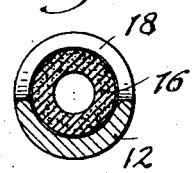

Patented Sept. 13, 1932

1,876,988

UNITED STATES PATENT OFFICE

HENRY W. LORMOR, OF CLEVELAND HEIGHTS, OHIO, ASSIGNOR TO WILLARD STORAGE BATTERY COMPANY, OF CLEVELAND, OHIO, A CORPORATION OF WEST VIRGINIA

SHUT-OFF VALVE FOR FILLING NOZZLES

Application filed September 10, 1927. Serial No. 218,820.

This invention relates to shut-off valves for flexible fluid conducting tubing and more particularly to a shut-off valve and filling nozzle particularly adapted for use in connection with the filling of storage batteries with electrolyte, although many other uses will be apparent.

Heretofore in filling storage batteries with the electrolyte fed through a flexible tubing or hose, it has been customary to provide for shutting off the flow of acid by a manually operated lever or valve associated with the flexible tubing, or by an auxiliary manually operated valve at some remote point from the discharge nozzle in the filling line. This has been more or less a disadvantage in that it required manual operation to shut off the flow of acid through the discharge nozzle and if for any reason the discharge nozzle should be laid aside, and the auxiliary valve in the filling line were not closed previously, the acid escaped through the discharge nozzle as soon as the operator's hand was released from the fluid control lever, thereby causing the acid to be spilled. It is, therefore, one of the principal objects of the present invention to provide a shut-off valve which is semi-automatic, that is, which is automatically moved to shut off the flow of liquid through the discharge nozzle but which requires the operator to manually open the shut-off valve in order that the acid can be discharged from the nozzle.

Another disadvantage in the use of flexible tubing for conveying the flow of acid through the discharge nozzle is the lack of suitable holding or gripping means for the operator, which is due primarily to the flexibility of the tubing, and it is, therefore, a further object of the present invention to provide a suitable supporting means for the end of the flexible tubing adjacent the discharge nozzle, so as to provide a suitable hand-grip for the operator.

Another object of the invention is to so construct the shut-off valve that it may be manually held by the operator in a plurality of positions to thereby permit any desired flow of the acid through the discharge nozzle.

A still further object of the invention is to provide a device of the type referred to, which is simple in construction, economical to manufacture, and exceptionally efficient in operation.

With the objects above indicated and other objects hereinafter explained in view, my invention consists in the construction and combination of elements hereinafter described and claimed.

Referring to the drawing—

Fig. 1 is a side elevational view of the device embodying my present invention;

Fig. 2 is a transverse sectional view taken on line 2—2 of Fig. 1, and showing the means for shutting off the flow of acid;

Fig. 3 is a transverse sectional view taken on line 3—3 of Fig. 2, showing the manner of securing the discharge nozzle to the shut-off valve;

Fig. 4 is a transverse sectional view taken on line 4—4 of Fig. 1, showing the pivotal connection between the upper and lower handle portions; and Fig. 5 is a transverse sectional view taken on line 5—5 of Fig. 1, showing the manner of supporting the rear end of the flexible tubing.

In the drawing, 10 indicates what may be termed the lower handle portion of the device composed preferably of light metal, such as aluminum, which is provided with a substantially flat horizontal portion 11 and a rearwardly extending semi-circular portion 12. At the front end of the flat horizontal portion 11 is a semi-circular enlargement 13 formed integral with the portion 11 and which is adapted to receive and support therein a discharge nozzle 14, preferably of acid resisting material in the present instance, inasmuch as the device is to be employed in connection with the filling of storage batteries with electrolyte or other acids. This discharge nozzle 14 is secured to the semi-circular projection 13 by a band 15, preferably of elastic material, which encircles both members and securely maintains them in assembled position.

The semi-circular portion 12 is of a shape suitable to receive and support therein a flexible hose or tubing 16, preferably of rubber, the forward end of which rests upon the horizontal flat portion 11 and is connected to the rear end 17 of the discharge nozzle 14, as clearly shown in Fig. 1. The rear end of the portion 12 is provided with an integral tubular extension 18 through which the flexible tubing 16 extends. At the rear of the horizontal flat portion 11 are a pair of laterally extending ears 19 formed integral with the flat portion 11 and at the outer edges thereof. These ears 19 are spaced a suitable distance apart, as shown in Fig. 4, and extend a suitable distance upwardly so as to receive therebetween the flexible tubing 16 which ears function to further support the tubing. These ears are provided with transverse apertures 20 which align with transverse apertures 21 provided in a pair of co-operating ears 22 and are pivotally connected together by transverse pins 23. These ears 22 extend laterally and are formed integrally with the upper handle 24, preferably of aluminum or other light material, and the rear portion 25 of the latter is formed preferably semi-circular so as to provide a suitable hand-grip for the operator. The forward end of the upper handle 24 is provided upon its underface with a transverse rounded projection 26 which extends transversely of the flexible tubing 16, and is adapted to co-operate with a transversely extending rounded projection 27, provided upon the upper face of the horizontal flat portion 11 substantially midway between the semi-circular projection 13 and the laterally extending ears 19. These rounded projections 26 and 27, extending transversely of the flexible tubing 16, co-operate, when moved toward each other, to depress the flexible tubing 16 and thereby shut off the flow of acid through the tubing, but as the extensions are moved away from each other, the amount of flow of acid through the flexible tubing 16 is regulated by the relative distance apart of the projections 26 and 27.

The flow of acid through the flexible tubing 16 is, as previously stated, preferably shut off at all times when the device is not being employed, and I prefer to provide an automatic means whereby the flow of acid is normally shut off.

A yoke or U-bolt 28 extends under and transversely of the flat portion 11 of the lower handle 10, and the free ends extend upwardly through a pair of horizontally positioned ears 29 formed integrally, upon opposite sides, with the flat portion 11, as clearly shown in Fig. 1.

The U-bolt 28 is provided with a transversely extending stamped plate 30 having suitable openings through which the ends of the bolt extend, and which plate is adapted to rest upon the forward end of the upper handle 24.

A second stamped plate 31 is provided with suitable openings to receive the upper ends of the U-bolt 28, and disposed between the plates 30 and 31 is a compression coil spring 32, encircling a suitable spring guide member 33, which has at its lower end a screw threaded extension 34 adapted to be screwed into a suitable opening in both the plate 30 and the end of the upper handle 24, as shown in Fig. 2. The upper end of the spring guide 33 is provided with a reduced extension 35 and is adapted to slide within a transverse opening 36 in the upper plate 31. The tension of the spring 32 is regulated by means of nuts 37 having threaded engagement with the free ends of the U-bolt 28. The tension of the spring 32 is such that the transverse projections 26 and 27 are normally forced toward each other to thereby compress or close the flexible tubing 16, where the latter passes between the projections, and thereby normally shuts off the flow of acid.

The operation of the device is thought to be readily understood from the foregoing description and it will, therefore, suffice to say that in order to cause the acid within the flexible tube 16 to flow from the discharge nozzle 14, the upper handle 24 is depressed towards the lower handle 10 and, pivoting about the pins 23, causes the projections 26 and 27 to be moved away from each other. This permits the flexible tubing 16 to open at this point and the acid is, therefore, free to flow through the discharge nozzle 14. If, for any reason, the operator should care to set aside the device, the flow of acid is automatically shut off upon the release of the handles 10 and 24 by the operator, this being caused by the spring 32 which normally tends to move the projections 26 and 27 into engagement with the flexible tubing 16. The amount of acid discharged through the discharge nozzle 14 is controlled by the relative movement between the projections 26 and 27. For instance, if the operator just slightly depresses the upper handle 24 only a small quantity of acid will flow through the discharge nozzle, inasmuch as the opening within the flexible tubing 16 is restricted by engagement between the projections 26 and 27 and the tubing. If a greater flow is required, the upper handle 24 is fully depressed and the projections 26 and 27 are moved substantially out of engagement with the flexible tubing 16, so that the acid can flow through the tubing unrestricted.

While I have described the invention as applicable for storage battery filling, it should be understood that there are many other uses for which this device can be employed and I am, therefore, not to be limited to its precise use or the precise structure, inasmuch as changes and modifications may be made thereto without departing from the spirit of the invention, as defined in the appended claims.

Having thus described my invention, I claim:

1. In a device of the type described, an elongated substantially channel-shaped handle portion adapted to support a flexible tube therein, a discharge nozzle attached to one end of said handle portion and adapted to receive one end of said flexible tube, a second handle portion pivotally attached to said first handle portion and having its forward end terminating short of the adjacent end of said first handle portion, aligned means on said handle portions disposed between said discharge nozzle and the pivot of said handle portions and adapted to engage the flexible tube upon opposite sides thereof, and means normally urging said aligned means toward each other.

2. In a device of the type described, a handle portion adapted to support a flexible tube, a discharge nozzle supported by said handle portion and adapted to be connected to said tube, a projection on said handle portion adapted to engage said tube, a second handle portion pivoted to said first mentioned handle portion, a projection on said second handle portion in alignment with the projection on said first mentioned handle portion and adapted to engage said tube, a yoke extending around both handle portions, and resilient means carried by said yoke for normally forcing said projections toward each other to thereby close the opening in said tube.

3. In a device of the type described, a substantially U-shaped handle portion having a circular enlargement at the rear thereof through which a flexible tube is adapted to be inserted and a semi-circular portion at the forward end thereof, a discharge nozzle disposed in said semi-circular portion at the forward end of the handle portion and adapted to be connected to the end of the tube, ears on the opposite sides of said handle portion between which said tube is adapted to extend, a projection on said handle portion adapted to engage with said tube, a second handle portion co-extensive with said first mentioned handle portion and pivotally connected to the ears of the latter, a projection on said second handle portion adapted to engage said tube on the opposite side from said first mentioned projection, and resilient means for normally forcing the projections toward each other to thereby close the opening in said tube.

4. In a device of the type described, a lower handle member having a semi-circular portion and a cylindrical end portion within which a flexible tube is adapted to extend, a discharge nozzle detachably connected to the forward end of said lower handle member and adapted to be connected to the flexible tube, a pair of integrally formed ears extending upon opposite sides of the tube, a transverse projection on said handle member adapted to engage said tube, an upper handle member co-extensive with said lower handle member and pivoted between its ends to said ears, a transverse projection on said upper handle member in alignment with the first mentioned projection, a yoke extending around said handle members, and resilient means carried by said yoke for normally forcing said projections toward each other to thereby close the opening in said tube.

5. A shut-off valve for flexible tubing and the like, comprising a handle member adapted to support the end of the tube and having a cylindrical portion adapted to encircle said tube, a discharge nozzle connected to said handle member and adapted to be connected to the end of the tube, means on the handle member adapted to engage said tube, a second handle member pivoted between its ends to said first mentioned handle member, means on said second handle member adapted to engage said tube in co-operation with said means on said first mentioned handle member, a yoke extending around said handle members, resilient means carried by said yoke for normally forcing said means carried by said handle members toward each other to thereby close the opening in said tube, and means for adjusting the resilient means.

In testimony whereof, I hereunto affix my signature.

HENRY W. LORMOR.